(12) United States Patent
Yamada et al.

(10) Patent No.: US 6,188,528 B1
(45) Date of Patent: Feb. 13, 2001

(54) OPTICAL LENS, AND OPTICAL PICKUP AND OPTICAL DISC APPARATUS USING SUCH LENS

(75) Inventors: Takatoshi Yamada; Norio Fukasawa, both of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/343,553

(22) Filed: Jun. 30, 1999

(30) Foreign Application Priority Data

Jul. 9, 1998 (JP) .................................................. 10-194287

(51) Int. Cl.[7] ....................................................... G02B 3/02
(52) U.S. Cl. .......................... 359/719; 359/718; 359/714; 359/712
(58) Field of Search .................................... 359/718, 719, 359/712, 713, 714

(56) References Cited

U.S. PATENT DOCUMENTS

| | | | |
|---|---|---|---|
| 4,738,516 | * 4/1988 | Verhoeven et al. | 350/432 |
| 5,491,765 | * 2/1996 | Matsumoto | 385/33 |
| 5,680,256 | 10/1997 | Katsuma | 359/719 |
| 5,936,782 | * 8/1999 | Nomura et al. | 359/719 |
| 5,974,013 | * 10/1999 | Kadono | 369/54 |

FOREIGN PATENT DOCUMENTS

| | | |
|---|---|---|
| 8334686 | 12/1996 | (JP) . |
| 9054247 | 2/1997 | (JP) . |
| 10082951 | 3/1998 | (JP) . |

* cited by examiner

*Primary Examiner*—Georgia Epps
*Assistant Examiner*—Tim Thompson
(74) *Attorney, Agent, or Firm*—Ronald P. Kananen; Rader, Fishman & Grauer (57) ABSTRACT

An optical lens composed of a transparent material, wherein one surface thereof on a light source side is a convex aspherical surface of rotation symmetry defined by a function relative to the radial distance from an optical axis. The aspherical surface is shaped to be a curved one without any stepped region with regard to the radial direction in the defined area, and has a portion where the derivatives of the function are discontinuous at a predetermined radial position. Although not equipped with an iris diaphragm, this optical lens is capable of eliminating an incident light beam outside the optical effective surface thereof without deteriorating the optical characteristics.

11 Claims, 9 Drawing Sheets

OPTICAL LENS, AND OPTICAL PICKUP AND OPTICAL DISC APPARATUS USING SUCH LENS

BACKGROUND OF THE INVENTION

The present invention relates to an objective lens used in an optical pickup for recording and/or reproducing signals of a mini disc (MD), magneto-optical disc (MO), compact disc (CD), CD-ROM or the like (hereinafter referred to as "optical disc"), and also to an optical pickup and an optical disc apparatus equipped with such an objective lens.

Figure 6:
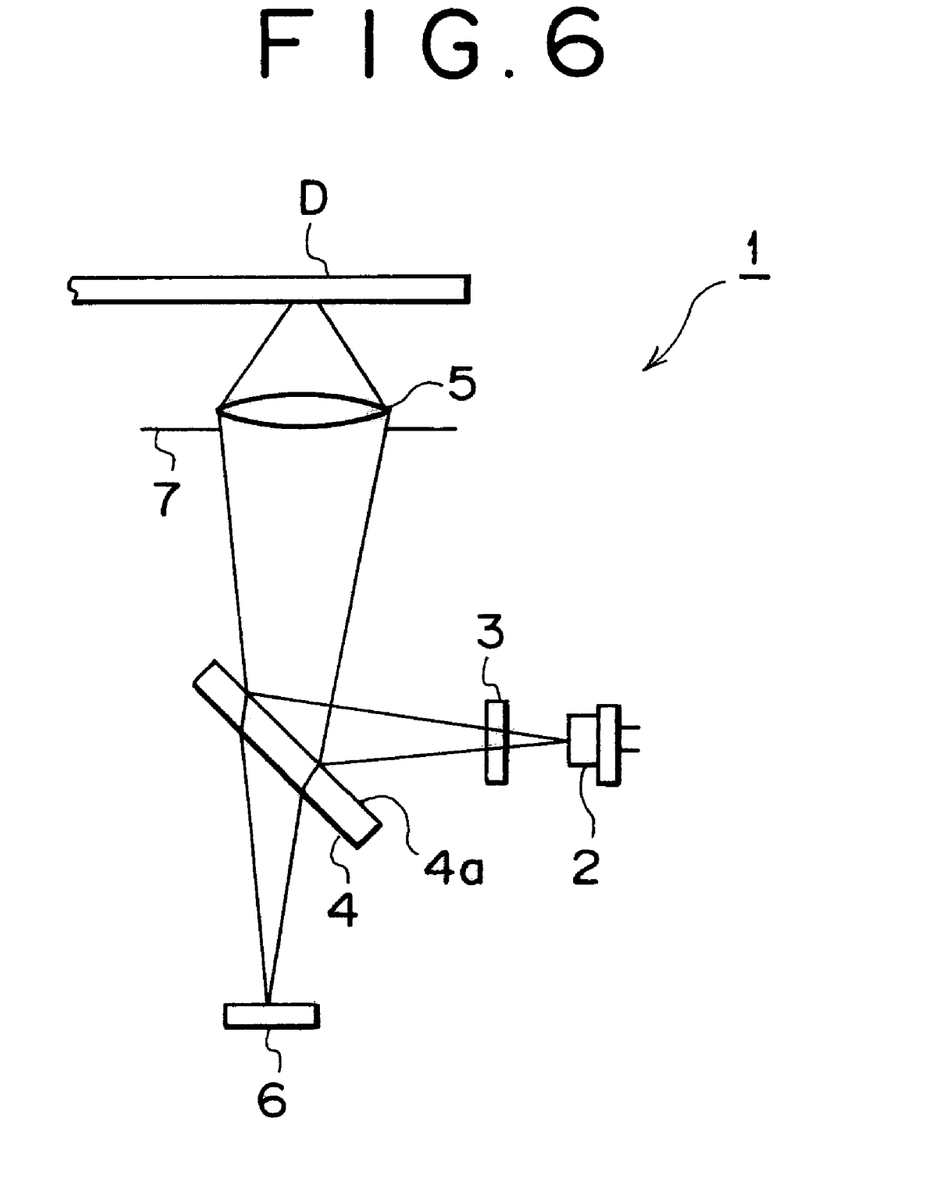
FIG. 6 is a plan view showing an exemplary structure of a conventional optical pickup.

According to the related art, an exemplary optical pickup designed for an optical disc has the structure shown in FIG. 6.

In FIG. 6, the optical pickup 1 comprises a semiconductor laser element 2, a grating 3, a beam splitter 4, an objective lens 5 and an optical detector 6.

The grating 3 is a diffraction type which divides an incident light beam emitted from the semiconductor laser element 2 into a main beam of zeroth-order light and side beams of plus and minus first-order light.

The beam splitter 4 is so disposed that its reflecting surface has an inclination of 45° to the optical axis, and separates the return light, which is obtained from the signal recording plane of the optical disc D, from the light beam emitted from the semiconductor laser element 2. More specifically, the light beam emitted from the semiconductor laser element 2 is reflected by the reflecting surface 4a of the beam splitter 4, while the return light obtained from the optical disc D is transmitted through the beam splitter 4.

The objective lens 5 is convex and forms the light beam reflected by the beam splitter 4 into an image on a desired track on the signal recording plane of the optical disc D which is driven to be rotated. Further the objective lens 5 is supported by an unshown biaxial actuator, i.e., to be movable biaxially in a focusing direction and a tracking direction.

The optical detector 6 has a light receiving portion to receive the return light beam which is incident thereon after transmission through the beam splitter 4.

According to the optical pickup 1 of the structure described above, the light beam emitted from the semiconductor laser element 2 is divided by the grating 3 into a main beam and two side beams and, after being reflected by the reflecting surface 4a of the beam splitter 4, the beams are formed, via the objective lens 5, into an image at a certain point on the signal recording plane of the optical disc D.

The return light beam reflected by the signal recording plane of the optical disc D is incident on the beam splitter 4 via the objective lens 5 again. Here, the return light beam is transmitted through the beam splitter 4 and then is incident on the light receiving portion of the optical detector 6.

Thereafter, the information recorded on the signal recording plane of the optical disc D is reproduced on the basis of a detection signal outputted from the light receiving portion of the optical detector 5, and simultaneously a focus error signal FE and a tracking error signal TE are detected.

For accurate detection of the reproduced signal, the light beam emitted from the semiconductor laser element 2 is formed into a spot at a correct position on the signal recording plane of the optical disc, and the objective lens 5 is finely moved by an unshown biaxial actuator in accordance with the focus error signal FE and the tracking error signal TE, so as to perform exact reproduction of the recorded signal.

In the optical pickup 1 of the above structure, the objective lens 5 is generally composed of a plastic or glass material and is shaped into a single optical lens with aspherical surfaces. And, as shown in FIGS. 7A and 7B, an iris diaphragm 7 is disposed adjacently to the objective lens 5 so as to regulate the NA (numerical aperture) of the light beam irradiated onto the signal recording plane of the optical disc D via the objective lens 5.

Figures 7A, 7B:
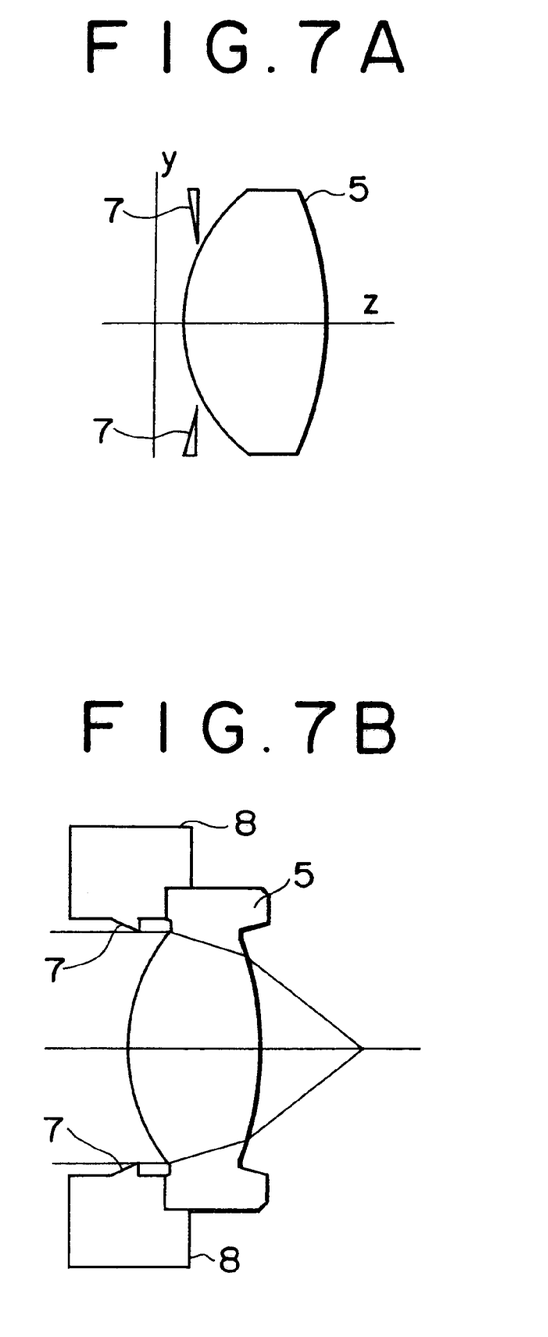
FIGS. 7A and 7B are sectional views showing structural examples of an objective lens and an iris diaphragm in the optical pickup of FIG. 6.

FIG. 7A shows an exemplary structure where an iris diaphragm 7 for regulating the NA (numerical aperture) of the light beam consists of an independent member separate from the objective lens 5 and is disposed adjacently to the lens 5, and FIG. 7B shows another structure where an iris diaphragm 7 is formed in a lens holder 8 which holds an objective lens 5.

Figure 8:
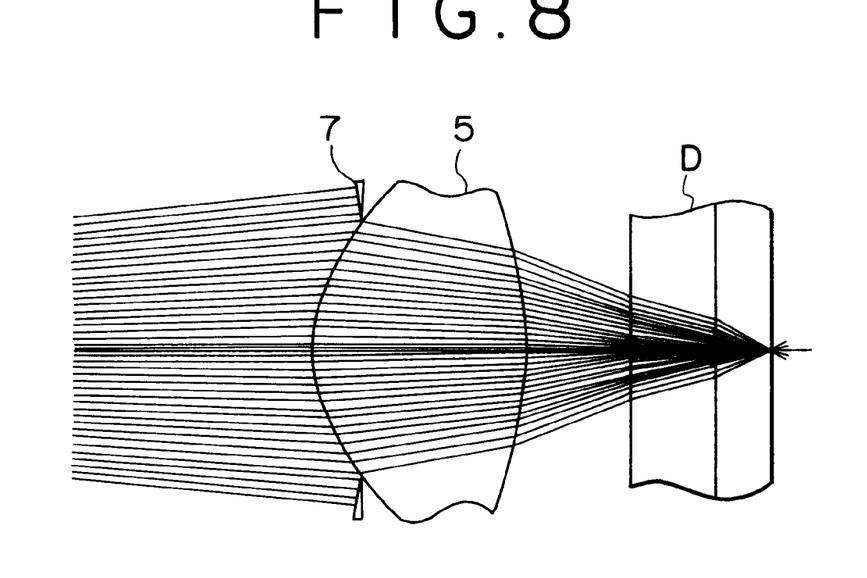
FIG. 8 is a sectional view of an optical path formed from a light source by the objective lens and the iris diaphragm in FIGS. 7.

Consequently, the light beam to be incident outside the optical effective surface of the objective lens 5 is partially intercepted by the iris diaphragm 7 as illustrated in FIG. 7, whereby any unnecessary partial light beam is eliminated to prevent any harmful influence when recording the information on or reproducing the same from the optical disc.

However, since the iris diaphragm 7 shown in each of FIGS. 7A and 7B is an independent component member separate from the objective lens 5, the total number of required component members is thereby increased, and in assembling the apparatus, it is necessary to align its optical axis with the objective lens 5 which to eventually brings about a problem of raising the costs of both component members and assembly.

And there exists another problem that, when the iris diaphragm 7 fails to be exactly aligned with the objective lens 5, asymmetry aberration is generated due to the surface shape outside of the optical effective surface of the objective lens 5.

Figure 9:
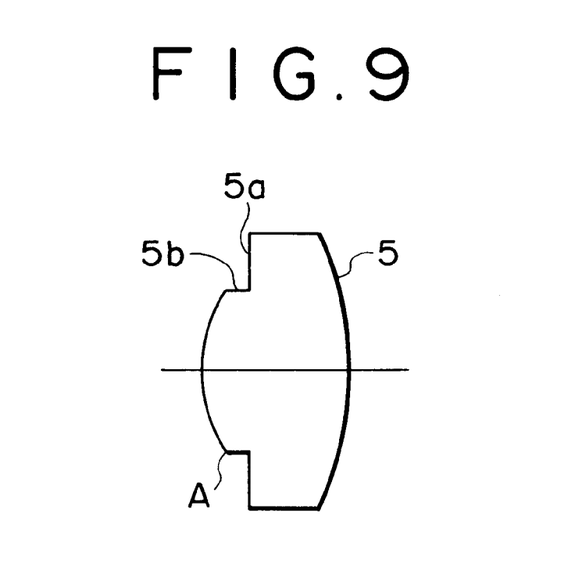
FIG. 9 is a sectional view showing a structural example of an objective lens with an iris diaphragm function in the optical pickup of FIG. 6.

There is proposed another known art wherein the surface shape of the objective lens 5 on the light source side is modified, as shown in FIG. 9, instead of using the iris diaphragm 7 mentioned above, and a recess 5a is formed outside the optical effective surface so as to give an iris diaphragm function to the objective lens 5 itself.

According to this method, the light beam to be incident outside the optical effective surface is actually incident on the recess 5a of the objective lens 5, so that such light beam is prevented from reaching the spot position on the signal recording plane of the optical disc D. Therefore, regarding the spot position on the signal recording plane of the optical disc D, the partial light beam incident outside the optical effective surface is intercepted to consequently achieve the same function as the iris diaphragm 7.

However, in the objective lens 5 with such recess 5a, it is difficult, when molding the same out of plastics or the like, to maintain an exact surface shape due to post-molding contraction and so forth if there is any sharp contour change such as a stepped region 5b where the curved surface is rendered discontinuous inside the recess 5a. For example, at a corner denoted by reference symbol A in FIG. 9, spherical aberration is generated due to the distortion caused in the molding process, hence raising a problem that the optical characteristic of the objective lens 5 is deteriorated.

Figure 10:
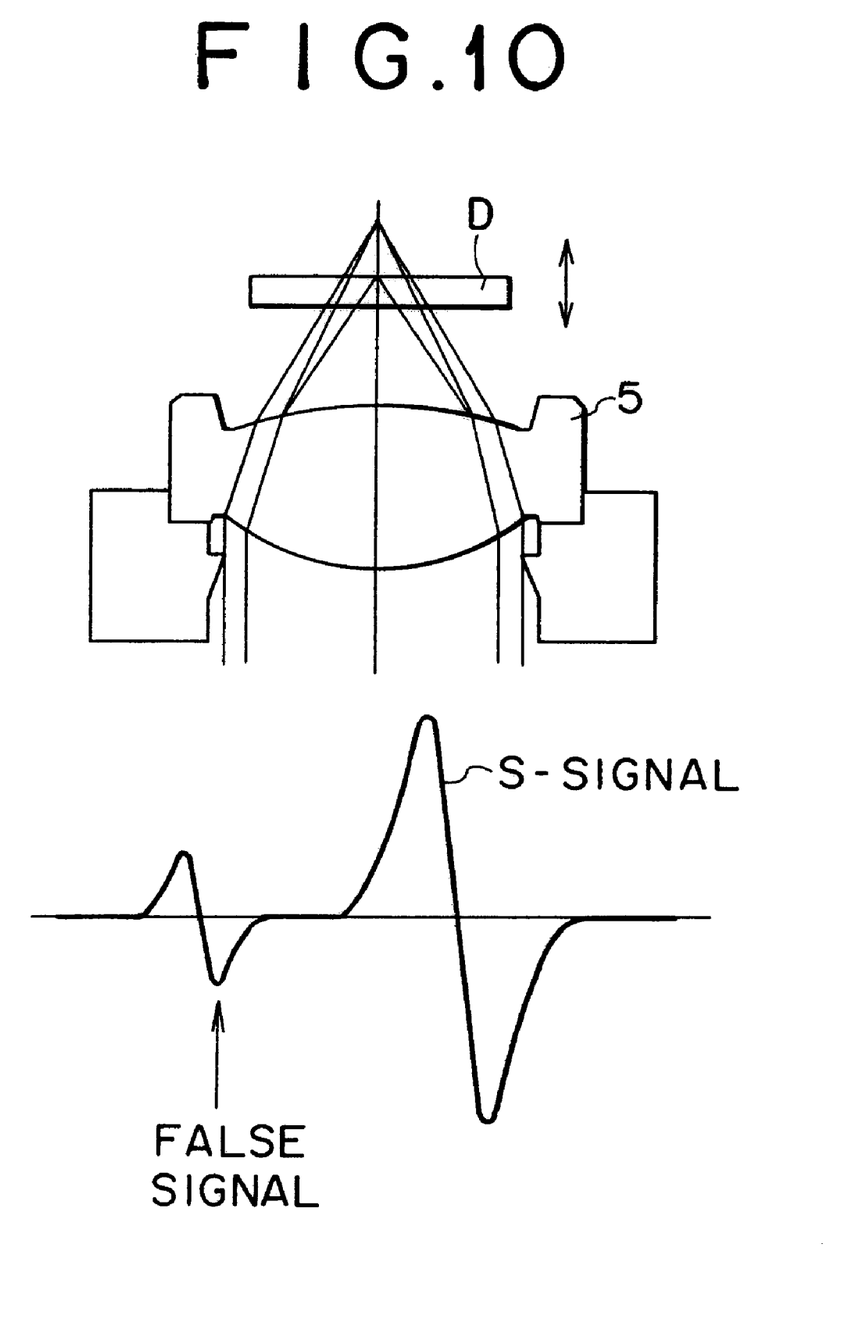
FIG. 10 shows a focusing control signal in an exemplary optical pickup according to the related art.

There is further proposed another example of FIG. 10, wherein two spots are formed along an optical axis by a single objective lens 5, so as to reproduce signals from a plurality of optical discs of mutually different standards. However, in execution of focusing control with such objective lens 5 that forms two spots, an S-signal of the spot not in use may be detected as a false signal to eventually raise a problem that two S-signals are generated. For this reason, it is considered difficult to perform exact detection of the focus error.

SUMMARY OF THE INVENTION

It is therefore an object of the present invention to provide an improved optical lens which is equipped with the function of an iris diaphragm and is capable of eliminating a partial incident light beam outside the optical effective surface thereof without deterioration of the optical performance.

And another object of the invention resides in providing an optical pickup and an optical disc apparatus employing such an optical lens as an objective one.

According to an aspect of the present invention, there is provided an optical lens composed of a transparent material, wherein one surface thereof on a light source side is a convex aspherical surface of rotation symmetry defined by a function relative to the radial distance from an optical axis. The aspherical surface is shaped to be a curved one without any stepped region with regard to the radial direction in the defined area, and has a portion where the derivatives of the function are discontinuous at a predetermined radial position.

In this optical lens, the difference between the derivatives of the function at the predetermined radial position is smaller than 0.3.

According to another aspect of the present invention, there is provided an optical pickup which comprises a light source for emitting a light beam; an objective lens consisting of the above-mentioned optical lens for focusing the light beam emitted from the light source onto a signal recording plane of an optical disc; a light split means disposed between the light source and the objective lens; and an optical detector having a light receiving portion to receive a return light beam split by the light split means and reflected from the signal recording plane of the optical disc.

According to a further aspect of the present invention, there is provided an optical disc apparatus which comprises an objective lens consisting of the above-mentioned optical lens for focusing a light beam emitted from a light source onto a signal recording plane of an optical disc; an optical detection means having a light receiving portion to receive the return light beam reflected from the signal recording plane of the optical disc; an objective lens drive means capable of moving the objective lens biaxially; a calculator for obtaining a servo signal in response to the signal from the light receiving portion of the optical detection means; and a servo means for supplying the servo error signal to the objective lens drive means.

In this structure, when the light beam emitted from the light source is to be incident on the light-source side surface of the lens, the incident light inside the predetermined radial position from the optical axis is focused at a position of a fixed distance in the direction of the optical axis, e.g., on the signal recording plane of the optical disc, in accordance with the shape of the aspherical surface, thereby forming a spot.

Meanwhile, the partial incident light outside the predetermined radial position from the optical axis is not focused at the position of the fixed distance in the direction of the optical axis, e.g., on the signal recording plane of the optical disc, since the derivatives are mutually discontinuous with respect to the shape of the aspherical surface and that of the inner surface, and therefore the outer incident light reaches the position slightly deviated from the fixed-distance position toward the direction perpendicular to the optical axis.

Consequently, out of the entire light incident on the optical lens, the partial incident light beam outside the position of the predetermined radius from the optical axis on the light-source side surface is not focused at the position where the inner incident light beam inside the predetermined radial position is focused, so that the surface portion outside the predetermined radial position serves as an iris diaphragm in conformity with the shape of the aspherical surface.

Thus, the iris diaphragm provided separately from the optical lens heretofore is no longer necessary, hence reducing the costs of both component members and assembly. Further, since the iris diaphragm function is attained due to such shape of the aspherical surface, there exists none of sharp change in the shape at the predetermined radial position. Accordingly, the distortion caused in the process of molding the optical lens is diminished to consequently prevent deterioration of the optical characteristics of the lens.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described in detail with reference to FIGS. 1 to 5 of the accompanying drawings.

Since the embodiments described below are preferred concrete examples of the present invention, technically desirable various limitations are attached thereto. However, it is to be understood that the scope of the present invention is not limited merely to such embodiments alone unless any description of limiting the invention is specified in the following explanation.

Figure 1:
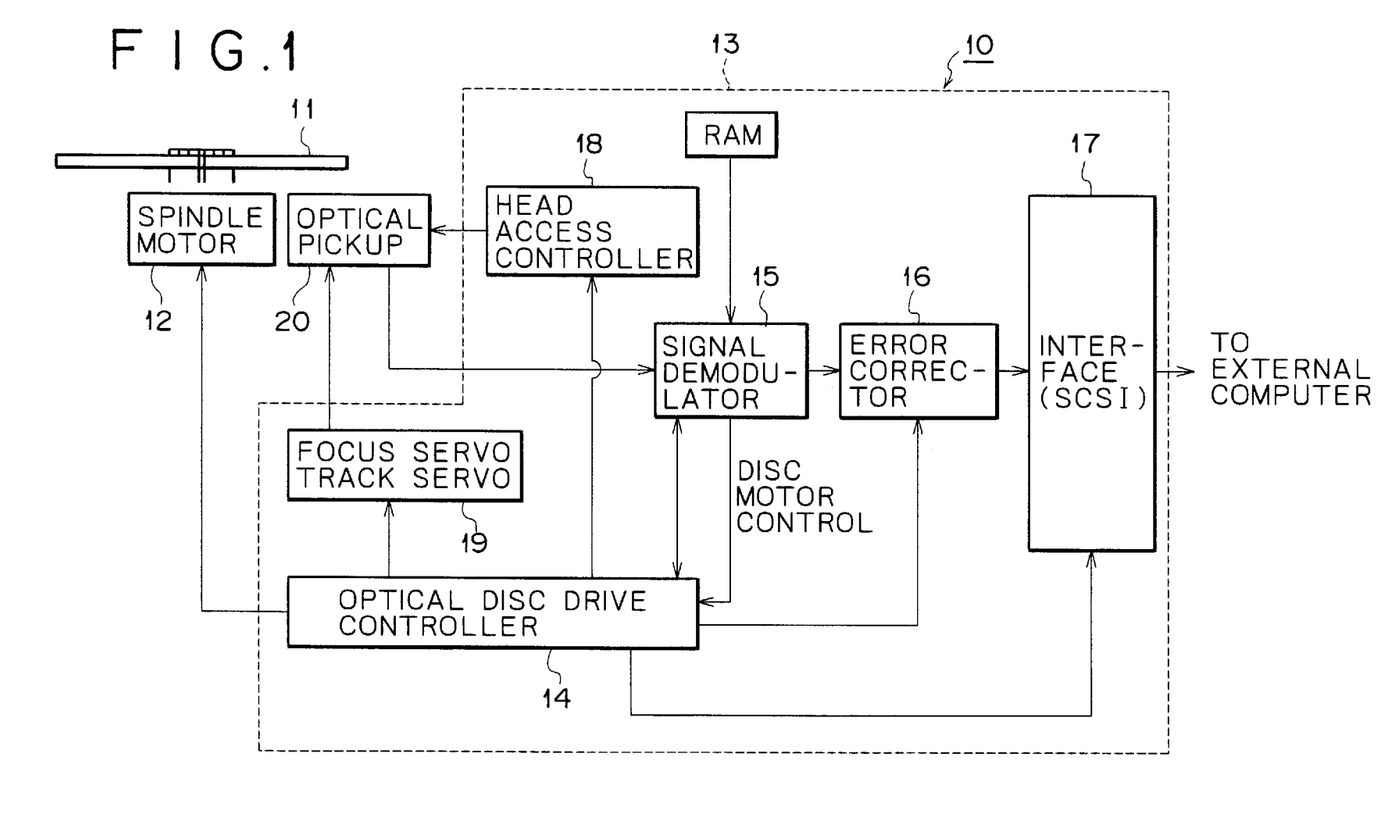
FIG. 1 is a block diagram showing the entire configuration of an optical disc apparatus where an embodiment of the optical pickup of the present invention is incorporated.

FIG. 1 is an overall block diagram showing the whole configuration of an optical disc apparatus where an embodiment of the optical pickup of the present invention is incorporated.

In FIG. 1, the optical disc apparatus 10 comprises a spindle motor 12 serving as a drive means to rotate an optical disc 11, an optical pickup 20 for recording a signal on a signal recording plane of the optical disc 11 in rotation while irradiating a light beam thereto, and reproducing the record signal on the basis of a return light beam obtained from the signal recording plane, and a control unit 13 for controlling such component members of the apparatus.

The control unit 13 comprises an optical disc drive controller 14, a signal demodulator 15, an error corrector 16, an interface 17, a head access controller 18, and a servo circuit 19.

The optical disc drive controller 14 drives the spindle motor 12 under control to rotate the same at a predetermined rate. The signal demodulator 15 demodulates the record signal obtained from the optical pickup 20 and, after error correction thereof, sends the corrected signal to an external computer or the like via the interface 17, so that the external computer or the like can receive, as a reproduced signal, the signal recorded on the optical disc 11.

The head access controller 18 moves the optical pickup 20 to a desired record track on the optical disc 11 by track jump or the like for example. Then the servo circuit 19 shifts an objective lens, which is being held by a biaxial actuator of the optical pickup 20 thus moved to the desired position, in both a focusing direction and a tracking direction.

Figure 2:
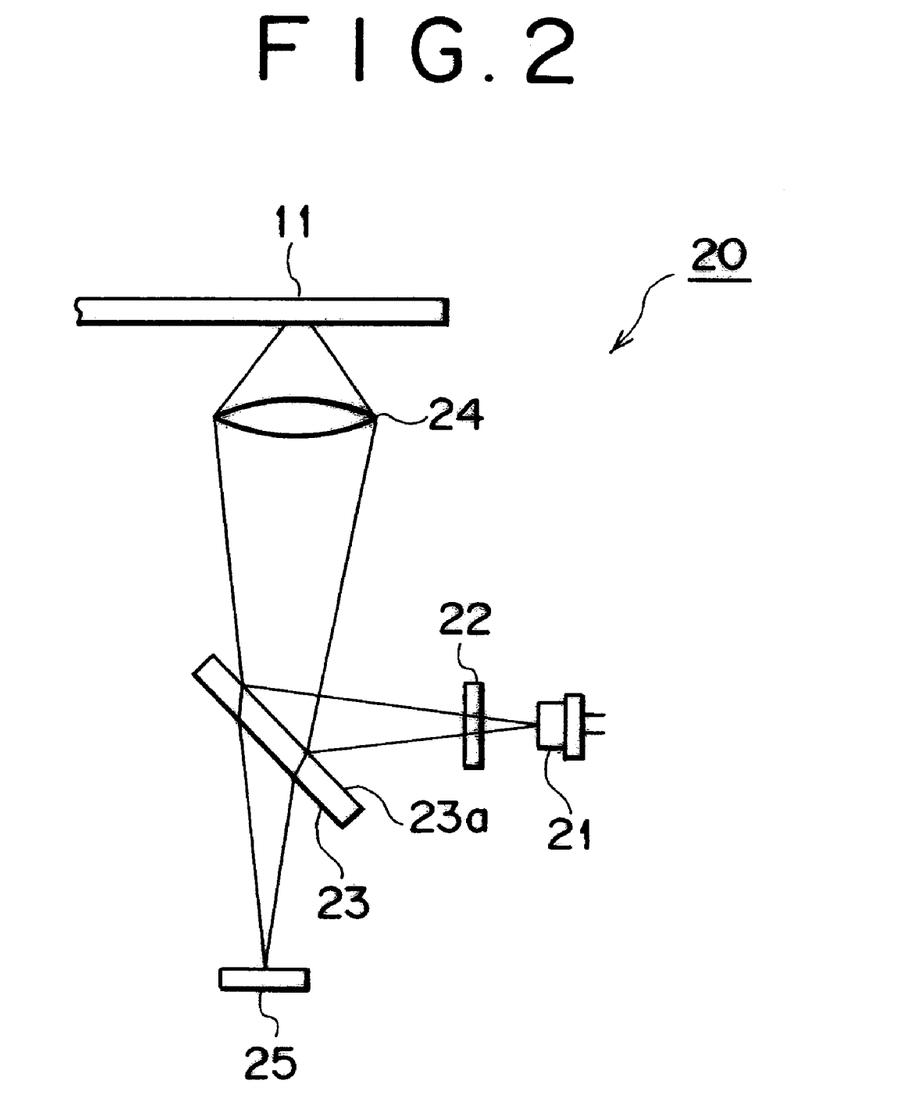
FIG. 2 is a plan view showing the structure of the optical pickup employed in the optical disc apparatus of FIG. 1.

FIG. 2 shows the structure of the optical pickup 20 incorporated in the optical disc apparatus 10 mentioned above.

In FIG. 2, the optical pickup 20 comprises a grating 22 as a light division means, a beam splitter 23 as a light split means, and an objective lens 24 as a light focus means, all of which are disposed successively in the optical path of a light beam emitted from the semiconductor laser element 21 as a light source. The optical pickup 20 further comprises an optical detector 25 disposed in the split light path formed by the beam splitter 23.

All the optical elements except the objective lens 24 mentioned above, i.e., semiconductor laser element 21, grating 22, beam splitter 23 and optical detector 25, are held fixedly on an optical base, which is supported to be displaceable in the radial direction of the optical disc 11, along a guide (not shown) provided in the optical pickup 20.

The semiconductor laser element 21 consists of a light emitting element which utilizes recombination radiation of a semiconductor, and emits predetermined laser light therefrom.

The grating 22 is a diffraction type to diffract the incident light. This grating 22 divides the light beam, which is emitted from the semiconductor laser element 21, into at least three light beams, i.e., one main beam composed of zeroth-order diffracted light and two side beams composed of plus and minus first-order diffracted light. Therefore, any other division element such as a hologram element may be used as well on condition that it is capable of producing at least three light beams through division of the incident light beam.

The beam splitter 23 is so disposed that its reflecting surface 23a has an inclination angle of 45° to the optical axis, and polarizes and splits the light beam obtained from the grating 22 and the return light from the signal recording plane of the optical disc 11. More specifically, the light beam from the semiconductor laser element 21 is reflected by the reflecting surface 23a of the beam splitter 23, while the return light beam is transmitted through the beam splitter 23.

In this embodiment, the beam splitter 23 is composed of plate glass, and astigmatism is generated as the return light from the optical disc 11 is transmitted through the beam splitter 23.

The objective lens 24 is composed of a transparent material such as plastic or glass and, as will be described later, it is a convex lens whose one surface on the light source side is aspherical. This lens 24 focuses the light beam from the beam splitter 23 onto a desired record track on the signal recording plane of the optical disc 11 in rotation.

The objective lens 24 is so held as to be movable in two axial directions by an unshown biaxial actuator, i.e., in both focusing and tracking directions.

The optical detector 25 has a light receiving portion to detect the return light beam transmitted through the beam splitter 23.

Figure 3A:
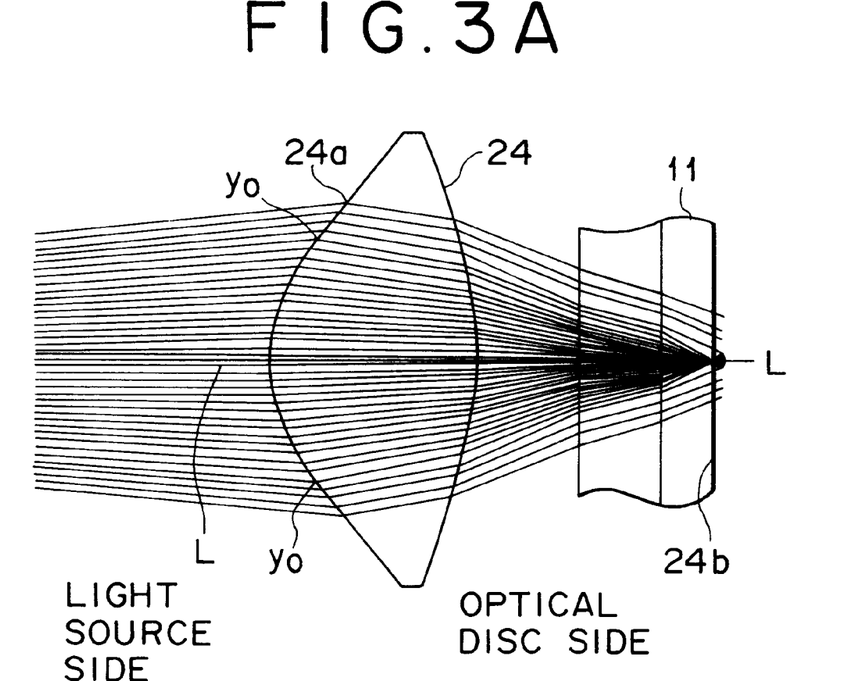
FIGS. 3A and 3B are sectional views of an objective lens in the optical pickup of FIG. 2.
Figure 3B:
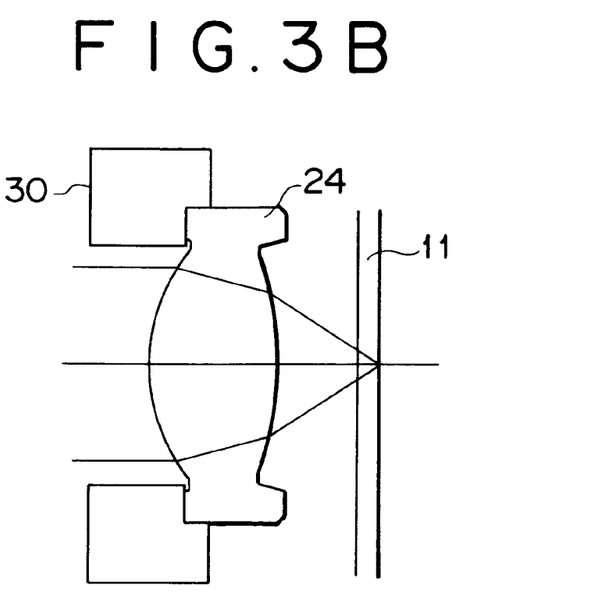

The objective lens 24 mentioned above has the structure shown in FIGS. 3A and 3B. FIG. 3A illustrates how the light is irradiated through the objective lens 24 onto the optical disc 11, and FIG. 3B shows the structure where the objective lens 24 is held by a lens holder 30 which has no iris diaphragm to regulate the numerical aperture of the lens.

In FIG. 3A, one surface 24a of the objective lens 24 on the light source side is a convex aspherical surface of rotation symmetry, wherein the function relative to the distance (radius) from the optical axis is given by Eq. 3 expressed as z=asp(y), in which y is the distance in the radial direction from the optical axis, and z is the distance in the optical-axis direction.

The derivatives of the function are continuous in the defined area, but are discontinuous at a predetermined radial position $y_0$. Here, the defined area of the objective lens 24 signifies a light transmission range where, in case the objective lens 24 is composed of transparent glass, the glass material on the light source side is existent.

Since the light rays passing through the defined area are marginal ones, the predetermined radial position $y_0$ shown in FIG. 3A is so decided that the numerical aperture of the lens becomes a predetermined value (required numerical aperture).

The discontinuity of the derivatives is so set that the absolute value v of the difference between the derivatives anterior and posterior to the position $y_0$, i.e.

$$v = \left| \left[ \frac{dasp(y)}{dy} \right]_{y \to -y_o} - \left[ \frac{dasp(y)}{dy} \right]_{y \to +y_o} \right| \quad \text{(Eq. 4)}$$

becomes $$v \leq 0.3 \quad \text{(Eq. 5)}$$

Figure 4:
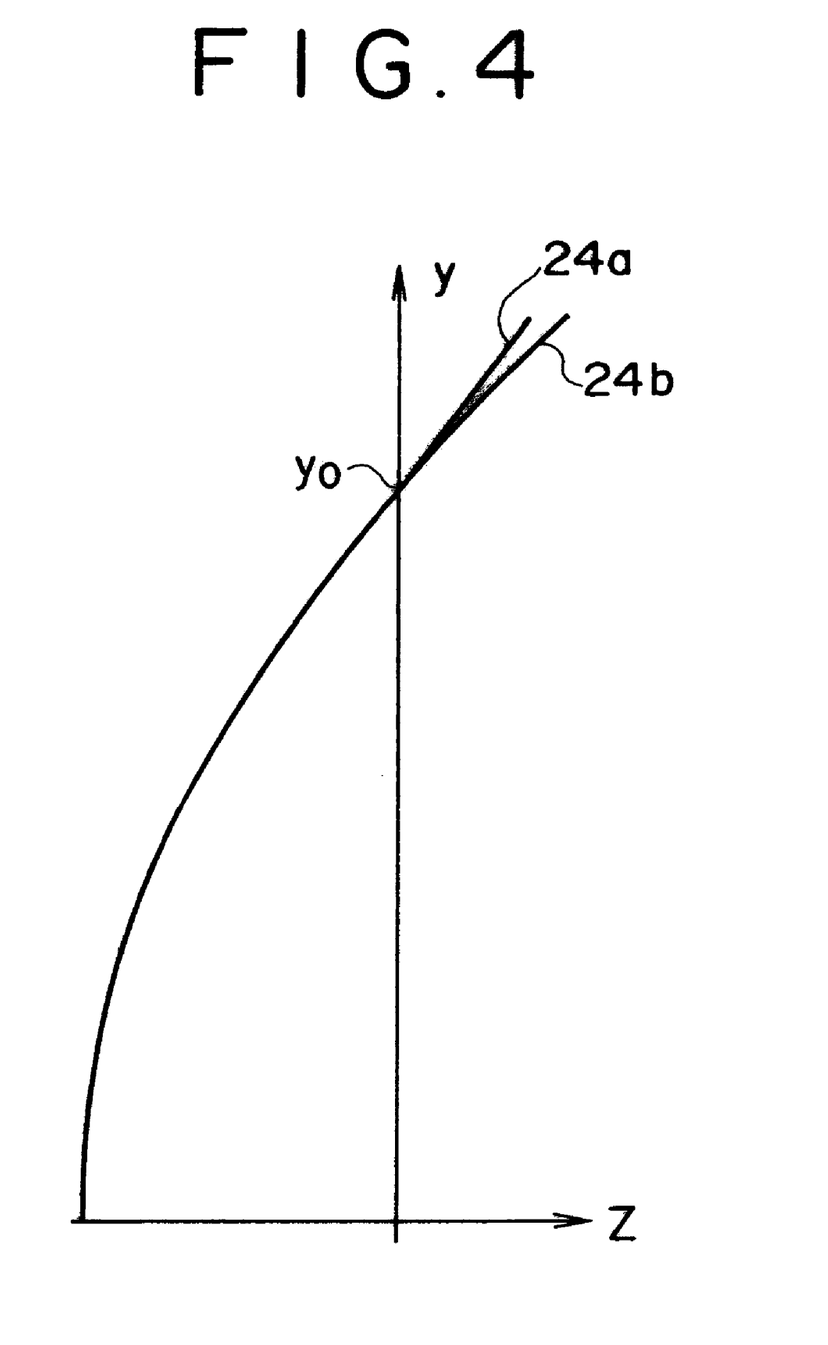
FIG. 4 is a partly enlarged sectional view showing in detail the light-source side shape of the objective lens in FIGS. 3.

Consequently, as shown in FIG. 4, the surface of the objective lens 24 on the light source side is deviated, outside the predetermined radial position $y_0$, as denoted by reference numeral 24a from the surface 24b which focuses the light beam at the same point as the inside, whereby the incident light beam is not focused on the signal recording plane of the optical disc 11.

Preferably, outside the predetermined radial position $y_0$, the surface of the objective lens 24 on the light source side is so formed as to be expressed by the following equation:

$$z = asp(y) + f(y - y_0) \quad \text{(Eq. 6)}$$

More specifically, the surface of the objective lens 24 on the light source side is defined by the function expressed as $$z = asp(y) + q(y - y_0) + p(y - y_0)^2 \quad \text{(Eq. 7)}$$

(where p and q are small constants)

In the above, small constants p and q signify that the distance from the original aspherical surface is small.

As a result, the outer light beam incident outside the predetermined radial position $y_0$ is not focused at any position other than the signal recording plane of the optical disc 11, and reaches the position deviated from the center of the optical axis in the direction perpendicular to the optical axis on the signal recording plane.

The optical disc apparatus 10 represented by this embodiment has the configuration mentioned above, and the following operation is performed therein.

First, the spindle motor 12 of the optical disc apparatus 10 is rotated to drive the optical disc 11. Subsequently the optical pickup 20 is moved in the radial direction of the optical disc 11 along an unshown guide, so that the optical axis of the objective lens 26 is displaced up to a desired track position on the optical disc 11 to thereby execute an access.

In this state, the light beam emitted from the semiconductor laser element 21 is divided into three light beams by the grating 22 in the optical pickup 20. Subsequently the light beams are reflected by the reflecting surface 23a of the beam splitter 23, and then are focused on the signal recording plane of the optical disc 11 via the objective lens 24.

The return light from the optical disc 11 is transmitted through the beam splitter 23 via the objective lens 24 again and then is formed into an image in the optical detector 25. Thus, the record signal obtained from the optical disc 11 is reproduced in accordance with the output signal of the optical detector 25.

In this process, the signal demodulator 15 detects a tracking error signal and a focus error signal from the output signal of the optical detector 25. In this embodiment, the tracking error signal is detected on the basis of the return light which is reflected from the optical disc 11 and is composed of the plus first-order light and the minus first-order light out of the three light beams obtained through division by the grating 22, while the focus error signal is detected on the basis of the astigmatism generated by transmission through the beam splitter 23. Then the servo circuit 19 executes servo control via the optical disc drive controller 14 to perform both focusing and tracking.

When the light beam emitted from the semiconductor laser element 21 is incident on the light-source side surface 24a of the objective lens 24, the incident light inside the predetermined radial position $y_0$ from the optical axis (i.e., within the optical effective surface) is focused to form a spot, as shown in FIG. 3A, at the position spaced apart by a fixed distance along the optical axis, i.e., on the signal recording plane of the optical disc 11, in conformity with the shape of the aspherical surface.

Meanwhile, the incident light outside the predetermined radial position $y_0$ from the optical axis is not focused at the position spaced apart by the fixed distance along the optical axis, i.e., on the signal recording plane of the optical disc, since the derivative of the aspherical surface shape is discontinuous with the derivative of the inner shape, so that the outer incident light reaches some other position deviated slightly therefrom in the direction perpendicular to the optical axis.

Consequently, out of the entire light incident on the objective lens 24, the light beam incident outside the predetermined radial position $y_0$ of the light-source side surface from the optical axis is not focused at the position where the inner incident light beam is focused, and thus the outer surface portion of the objective lens 24 outside the predetermined radial position serves as an iris diaphragm in conformity with the shape of the aspherical surfce, hence adjusting the numerical aperture of the objective lens 24 to an adequate value.

Therefore, the iris diaphragm 7 provided separately from the objective lens 5 in the conventional optical pickup 1 of FIG. 6 is no longer necessary to eventually reduce the costs of both component members and assembly.

Further, as the iris diaphragm function is attained due to the shape of the aspherical surface 24a of the objective lens 24 on the light source side, no sharp change in the shape at the predetermined radial position $y_0$, exists hence diminishing the distortion caused in the process of molding the objective lens 24.

Particularly when the difference between the derivatives at the predetermined radial position is less than 0.3, it is possible to achieve more effective diminution of the distortion generated in the molding process.

In case the difference between the derivatives is in excess of 0.3, the change in the shape of the aspherical surface at the predetermined radial position becomes somewhat greater, so that slight distortion is generated in the molding process.

Moreover, since the iris diaphragm function is attained in the objective lens 24 itself, it is possible to prevent asymmetrical aberration that may otherwise be caused by any axial deviation of the iris diaphragm.

Figure 5:
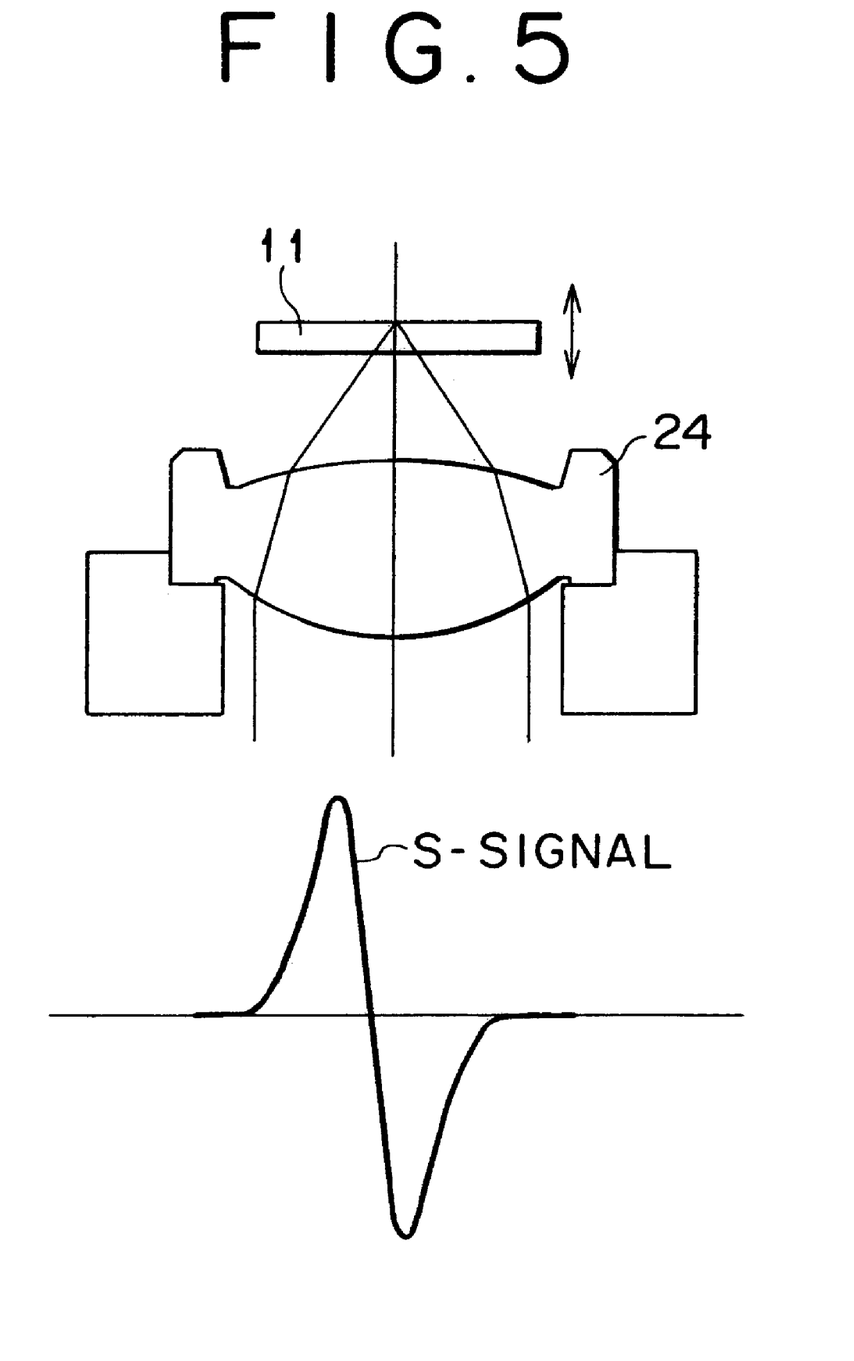
FIG. 5 shows a focusing control signal in the present invention.

In case the aspherical surface outside the predetermined radial position is given by Eq. 6, the outer light beam incident outside the predetermined radial position is not focused due to the refraction through the relevant surface portion. Therefore, this outer light beam is not focused to form another spot, unlike the one shown in FIG. 10, along the optical axis at another position differently from the inner light beam incident inside the predetermined radial position, and no false signal is produced, as shown in FIG. 5, with respect to the S-signal detected in focusing control, hence preventing occurrence of some disadvantage such as feint that may otherwise be generated by focus search or the like in the optical disc apparatus 10.

The embodiment described above represents an exemplary case with the objective lens 24 employed as an optical lens in the optical pickup 20 for an optical disc and also in the optical disc apparatus 10. However, the present invention is not limited to such embodiment alone, and it is apparent that the invention is applicable also to any optical lens employed in some other apparatus on condition that the optical lens is used with an iris diaphragm.

Further in the above embodiment of the optical disc apparatus 10 and the optical pickup 20, there are mentioned the structures of an optical disc apparatus and an optical pickup designed for reproduction of an optical disc. However, it is obvious that the present invention is applicable also to some other optical disc apparatus and optical pickup which are designed for recording and/or reproduction of magneto-optical disc, CD-R, CD-RW and so forth.

Thus, according to the present invention, it becomes possible to provide an improved optical lens with an iris diaphragm function, and an optical pickup and an optical disc apparatus using such a lens, which is capable eliminating a light beam outside the optical effective surface thereof without deteriorating the optical characteristics.

What is claimed is:

1. An optical lens, which comprises a transparent material, wherein one surface thereof on a light source side is a convex aspherical surface having a rotation symmetry defined by a function relative to a radial distance from an optical axis, and said aspherical surface is shaped to be curved without any stepped region with regard to a radial direction in a defined area, and has a portion where derivatives of said function are discontinuous at a predetermined radial positions wherein the differences between the derivatives at said predetermined radial position is smaller than 0.3.

2. The optical lens according to claim 1, wherein said aspherical surface is given by $$z=\text{asp}(y) \quad \text{(Eq. 1)}$$

where y is the distance in the radial direction of the lens from the optical axis, and z is the distance in the direction of the optical axis.

3. The optical lens according to claim 1, wherein a light incident on an inner area within said predetermined radial position is focused at a predetermined position on the optical axis of said lens, while a light incident on an outer area beyond said radial position is not focused.

4. An optical pickup comprising:

a light source for emitting a light beam;

an objective lens for focusing the light beam emitted from said light source onto a signal recording plane of an optical disc;

a light split means disposed between said light source and said objective lens; and an optical detector having a light receiving portion to receive a return light beam split by said light split means and reflected from the signal recording plane of said optical disc;

wherein said objective lens is an optical one composed of a transparent material, and one surface thereof on a light source side has a convex aspherical surface of rotation symmetry defined by a function relative to a radial distance from an optical axis, and said aspherical surface is shaped to be curved without any stepped region with regard to a radial direction in a defined area, and has a portion where derivatives of said function are discontinuous at a predetermined radial position.

5. The optical pickup according to claim 4, wherein a difference between the derivatives at said predetermined radial position is smaller than 0.3.

6. The optical lens according to claim 4, wherein said aspherical surface is given by $$z=\text{asp}(y) \quad \text{(Eq. 1)}$$

where y is the distance in the radial direction of the lens from the optical axis, and z is the distance in the direction of the optical axis.

7. The optical lens according to claim 4, wherein a light incident on an inner area within said predetermined radial position is focused at a predetermined position on the optical axis of said lens, while a light incident on an outer area beyond said radial position is not focused.

8. An optical disc apparatus comprising:

an objective lens for focusing a light beam emitted from a light source onto a signal recording plane of an optical disc;

an optical detection means having a light receiving portion to receive the return light beam reflected from the signal recording plane of the optical disc;

an objective lens drive means capable of moving said objective lens biaxially;

a calculator for obtaining a servo signal in response to a signal from the light receiving portion of said optical detection means; and a servo means for supplying a servo error signal to said objective lens drive means:

wherein said objective lens is an optical one composed of a transparent material, and one surface thereof on the light source side has a convex aspherical surface of rotation symmetry defined by a function relative to a radial distance from an optical axis, and said aspherical surface is shaped to be curved without any stepped region with regard to a radial direction in a defined area, and has a portion where derivatives of said function are discontinuous at a predetermined radial position.

9. The optical disc apparatus according to claim 8, wherein said optical lens is so formed that a light incident on an inner area within said predetermined radial position is focused on a signal recording plane of said optical disc on the optical axis of said lens, while a light incident on an outer area is irradiated to a position spaced apart from a focal point on said signal recording plane.

10. An optical lens comprising:

a transparent material, wherein one surface thereof on a light source side is a convex aspherical surface having a rotation symmetry defined by a function relative to a radial distance from an optical axis; and said aspherical surface is shaped to be curved without any stepped region with regard to a radial direction in a defined area, and has a portion where derivatives of said function are discontinuous at a predetermined radial position, wherein said aspherical surface is given by $z=\text{asp}(y)+f(y-y_0)$, where y is the distance in the radial direction of the lens from the optical axis, z is the distance in the direction of the optical axis, $y_0$ is the predetermined radial position, and $y>y_0$.

11. An optical lens comprising:

a light source for emitting a light beam;

an objective lens for focusing the light beam emitted from said light source onto a signal recording plane of an optical disc;

a light split means disposed between said light source and said objective lens; and an optical detector having a light receiving portion to receive a return light beam split by said light split means and reflected from the signal recording plane of said optical disc;

wherein said objective lens is an optical one composed of a transparent material, and one surface thereof on a light source side has a convex aspherical surface of rotation symmetry defined by a function relative to a radial distance from an optical axis, and said aspherical surface is shaped to be curved without any stepped region with regard to a radial direction in a defined area, and has a portion where derivatives of said function are discontinuous at a predetermined radial position, wherein said aspherical surface is given by $$z=\text{asp}(y)+f(y-y_0)$$

where y is the distance in the radial direction of the lens from the optical axis, z is the distance in the direction of the optical axis, $y_0$ is the predetermined radial position, and $y>y_0$.

* * * * *